(12) United States Patent
Souza

(10) Patent No.: US 11,681,525 B2
(45) Date of Patent: Jun. 20, 2023

(54) MOVING FILES BETWEEN STORAGE DEVICES BASED ON ANALYSIS OF FILE OPERATIONS

(71) Applicant: EMC IP Holding Company LLC, Hopkinton, MA (US)

(72) Inventor: Jason H. Souza, Merrimack, NH (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 427 days.

(21) Appl. No.: 16/693,859

(22) Filed: Nov. 25, 2019

(65) Prior Publication Data

US 2021/0157584 A1 May 27, 2021

(51) Int. Cl.
*G06F 16/00* (2019.01)
*G06F 9/30* (2018.01)
*G06F 16/23* (2019.01)
*G06F 9/54* (2006.01)

(52) U.S. Cl.
CPC ...... *G06F 9/30007* (2013.01); *G06F 9/30043* (2013.01); *G06F 9/545* (2013.01); *G06F 16/23* (2019.01)

(58) Field of Classification Search
None
See application file for complete search history.

(56) References Cited

U.S. PATENT DOCUMENTS

| | | | | |
|---|---|---|---|---|
| 6,173,379 B1 * | 1/2001 | Poplingher | ........... | G11C 11/417 711/5 |
| 6,862,604 B1 * | 3/2005 | Spencer | ................ | G06F 3/0679 707/821 |
| 7,103,731 B2 * | 9/2006 | Gibble | .................. | G06F 3/0686 711/170 |
| 7,620,740 B2 * | 11/2009 | Takase | .................. | G06F 3/0689 710/33 |
| 8,271,992 B2 * | 9/2012 | Chatley | ............... | H04L 67/1021 718/105 |
| 8,838,697 B2 * | 9/2014 | Lashkari | ................ | G06F 3/0605 710/13 |
| 9,286,486 B2 * | 3/2016 | Kirikova | .............. | G06F 21/6209 |
| 9,940,061 B2 * | 4/2018 | Hasegawa | ............... | G06F 3/061 |
| 10,942,813 B2 * | 3/2021 | Pandit | ................... | G06F 16/128 |
| 2009/0228669 A1 * | 9/2009 | Slesarev | ................ | G06F 3/0649 711/161 |

(Continued)

*Primary Examiner* — Jean M Corrielus
(74) *Attorney, Agent, or Firm* — min, Turocy & Watson, LLP

(57) ABSTRACT

According to an embodiment, a system can comprise a processor and a memory that can store executable instructions that, when executed by the processor of a first device, can facilitate performance of operations. The operations can comprise receiving, from a second device, a first indication of an operation that was performed on a file stored on the second storage device, and storing an indication of the operation in a data structure, resulting in the data structure storing the first indication and other indications of operations performed on the file. Further, the operations can comprise analyzing indications of operations, comprising the first indication and the second indications, performed on the file stored in the data structure. The operations can further comprise communicating, to the second device, a command to move the file to a third device.

20 Claims, 10 Drawing Sheets

(56) References Cited

U.S. PATENT DOCUMENTS

| | | | |
|---|---|---|---|
| 2010/0070466 A1* | 3/2010 | Prahlad | H04L 67/1095 |
| | | | 711/E12.001 |
| 2012/0047189 A1* | 2/2012 | Staffer | G06F 16/1727 |
| | | | 707/830 |
| 2012/0078985 A1* | 3/2012 | Staffer | G06F 16/1727 |
| | | | 707/830 |
| 2013/0124811 A1* | 5/2013 | Hamilton | G06F 3/061 |
| | | | 711/165 |
| 2013/0238711 A1* | 9/2013 | Lashkari | G06F 3/0635 |
| | | | 709/205 |
| 2015/0121089 A1* | 4/2015 | Kirikova | G06F 21/6209 |
| | | | 713/193 |
| 2016/0124678 A1* | 5/2016 | Hasegawa | G06F 3/061 |
| | | | 711/112 |
| 2017/0123935 A1* | 5/2017 | Pandit | G06F 16/27 |
| 2018/0285405 A1* | 10/2018 | Chan | G06Q 10/107 |
| 2019/0108341 A1* | 4/2019 | Bedhapudi | G06F 16/1752 |
| 2019/0109870 A1* | 4/2019 | Bedhapudi | H04L 63/0428 |
| 2019/0332577 A1* | 10/2019 | Yang | G06F 16/148 |
| 2021/0141769 A1* | 5/2021 | Sharma | G06F 16/185 |
| 2021/0208788 A1* | 7/2021 | Kottomtharayil | G06F 3/0613 |

* cited by examiner

500 →

```
// Read functions 510
SYS_read
SYS_readv
SYS_preadv
SYS_pread

//Write Functions 520
SYS_write
SYS_writev
SYS_pwritev
SYS_pwrite

//Open a file 530
SYS_open

// Delete 540
SYS_unlink

// Change permissions 550
SYS_chmod

// Change owner 560
SYS_chown

// User ID of the file's owner, Group ID of the file,
Status of the file 570
SYS_stat
SYS_fstatSYS_lstat
```

MOVING FILES BETWEEN STORAGE DEVICES BASED ON ANALYSIS OF FILE OPERATIONS

TECHNICAL FIELD

The subject application generally relates to computer file storage, and, for example, to storing data at multiple storage devices, and related embodiments.

BACKGROUND

As the use of large amounts of data by organizations increases, modern storage solutions can incorporate different types of storage devices. Enterprises can store data in different locations based on the characteristics of the data and the different storage options. While some past storage solutions used a combination of storage devices that provided different performance characteristics, modern storage solutions can combine storage systems with much larger differences in performance. Currently some of the highest performance storage solutions used by organizations can combine local storage devices that utilize high speed network connections and all flash memory with lower-cost storage solutions flexibly provided of the Internet by storage providers.

Problems can occur however when data that does not need to be stored in local, high performance storage devices is not identified and moved in a timely fashion. Adding to this complexity, individual files can have performance requirements that evolve over time.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a processor and a memory that can store executable instructions that, when executed by the processor, can facilitate performance of operations. The operations can comprise receiving, from a second device, an indication of an operation that was performed on a file stored on the second storage device. The operations can further comprise storing an indication of the operation in a data structure, resulting in the data structure storing the indication and other indications of operations performed on the file other than the indication. Further, the operations can comprise analyzing the indications of operations performed on the file stored in the data structure, with the indications including the indication and the other indications. The operations can further comprise communicating, to the second device, a command to move the file to a third device.

One or more additional embodiments can provide a method, comprising receiving, from a second device, an indication of an operation that was performed on a file stored on the second storage device. The method can further comprise storing an indication of the operation in a data structure, resulting in the data structure storing the indication and other indications of operations performed on the file other than the indication. Further, the method can comprise analyzing the indications of operations performed on the file stored in the data structure. The method can further comprise communicating, to the second device, a command to move the file to a third device.

Additional embodiments can comprise a machine-readable storage medium comprising executable instructions that, when executed by a processor of a computing device, facilitate performance of operations, the operations comprising detecting an operation performed on a file stored on a first storage device communicatively coupled to the computing device. The operations can further comprise storing an indication of the operation at a database server device, resulting the indication and other indications of operations performed on the file other than the indication stored at the database server device. Further, the operations can comprise retrieving the indications of operations performed on the file from the database server device, resulting in retrieved indication. The operations can further comprise moving the file from the first storage device to a second storage device, based on the analyzing the indications.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which:

FIG. 5 lists out example system calls for a kernel that can be monitored to facilitate moving a file from one storage device to another storage device, in accordance with one or more embodiments.

DETAILED DESCRIPTION

Various aspects described herein are generally directed towards facilitating the moving of a file from one storage device to another storage device based on analysis of monitored system calls for the file, in accordance with one or more embodiments. As will be understood, the implementation(s) described herein are non-limiting examples, and variations to the technology can be implemented.

Reference throughout this specification to "one embodiment," "one or more embodiments," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein employ hardware and/or software to solve problems that are highly technical in nature (e.g., analysis of monitored system calls for the file by different processes), that are not abstract and cannot be performed as a set of mental acts by a human. For example, a human, or even a plurality of humans, cannot efficiently, accurately and effectively, manually analyze the usage of unstructured data files, with the same level of accuracy and/or efficiency as the various embodiments described herein.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Generally speaking, some embodiments described herein can assess storage requirements for a stored file based on monitoring different events for the file over time. Some embodiments can further assess the storage characteristics of different storage devices, and based on the storage requirements of the file and the storage characteristics of storage device options, one or more embodiments can select and change the storage location of the file, if it is determined to be requested or required. Additional notable features of one or more embodiments include updating file metadata based on analysis of the monitored events, and determining the storage requirements for a file by using the operating system kernel of a storage device to monitor system calls for the file.

Figure 1:
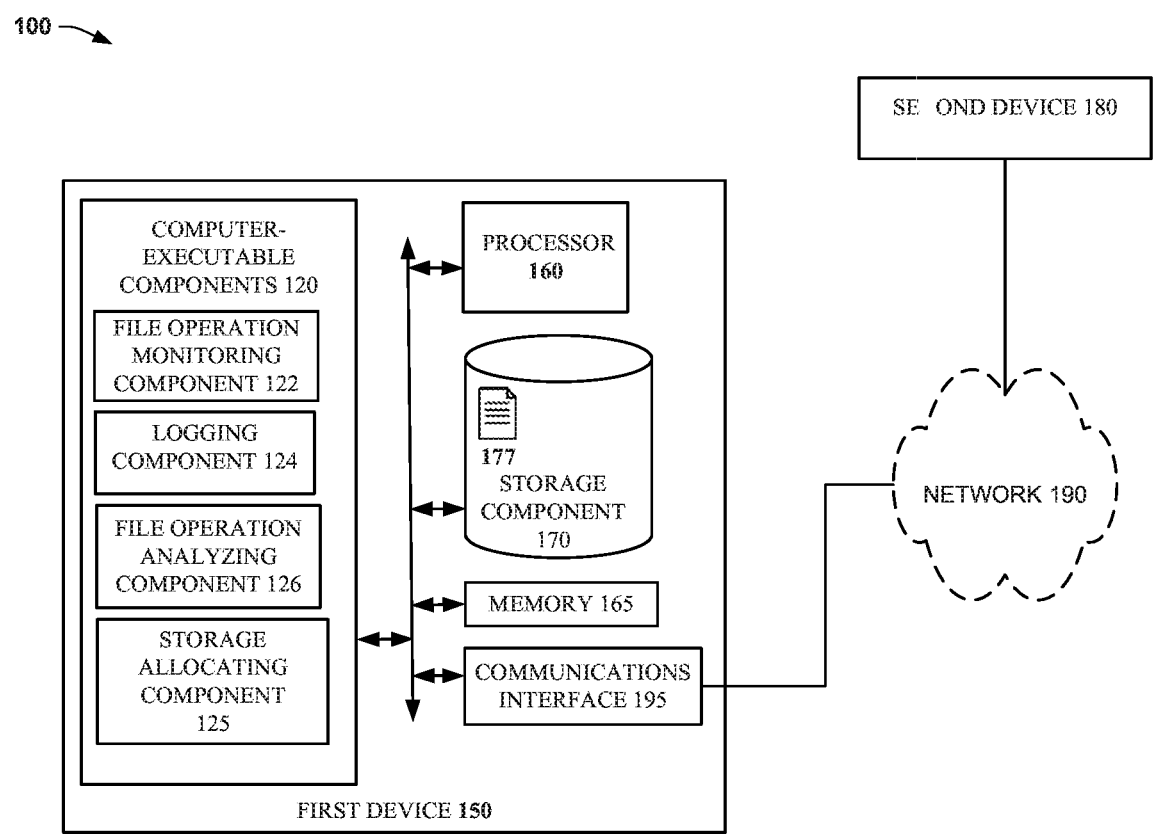
FIG. 1 illustrates a block diagram of an example, non-limiting system that can facilitate moving a file from one storage device to another storage device based on analysis of monitored system calls for the file, in accordance with various aspects and implementations of the subject disclosure.

FIG. 1 illustrates a block diagram of an example, non-limiting system 100 that can facilitate moving a file from one storage device to another storage device based on analysis of monitored system calls for the file, in accordance with various aspects and implementations of the subject disclosure. Repetitive description of like elements and/or processes employed in respective embodiments is omitted for sake of brevity.

System 100 can include first device 150 communicatively coupled to second device 180 via network 190. First device 150 can include computer-executable components 120, processor 160, storage component 170, memory 165, and communications interface 193. Computer-executable components 120 can include file operation monitoring component 122, logging component 124, file operation analyzing component 126, and storage allocating component 125. Examples of network 190 that can be used by one or more embodiments are discussed with FIGS. 9 and 10 below.

In one or more embodiments, system 100 can comprise memory 165 that can store computer executable components, and processor 160 that can execute the computer executable components stored in the memory. As discussed further below with FIG. 10, in some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1016 and FIG. 10. Such examples of memory 165 can be employed to implement any embodiments of the subject disclosure.

According to multiple embodiments, processor 160 can comprise one or more types of processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like.

In one or more embodiments, memory 165 can store computer-executable components 120 that, when executed by processor 160, can facilitate performance of operations, that can include monitoring, by a system comprising a processor, an operation performed on a file stored on a first storage device, storing an indication of the operation in a data structure, resulting in the data structure storing the indication and other indications of operations performed on the file other than the indication, analyzing the indications of operations performed on the file other than the indication stored in the data structure, and moving the file from the first storage device to a second storage device, based on the analyzing the indications. In the example depicted in FIG. 1, the operations can include monitoring an operation performed on a file 177 stored in storage component 170 of first device 150, storing an indication of the operation in a data structure (e.g., a data structure stored in storage component 170 or on an external device), resulting in the data structure storing the indication and other indications of operations performed on the file 177 other than the indication, analyzing the indications of operations performed on the file 177 stored in the data structure in storage component 170, and moving the file 177 from the first device to second device 180, based on the analyzing the indications. In an alternative embodiment, the indication of the operation can be stored in a data structure that is managed by a database application, e.g., executed on a database server (not shown) or as a computer-executable component 120.

In other embodiments, processor 160 can execute the computer-executable components 120 stored in memory 165 that can implement components that can include, but are not limited to, file operation monitoring component 122, logging component 124, file operation analyzing component 126, storage allocating component 125, any other components discussed herein that can be used with FIG. 1, and other examples. In an example use of the noted components, file operation monitoring component 122 can monitor an operation performed on a file stored on a first storage device, and logging component 124 can store an indication of the operation in a data structure, resulting in the data structure storing the indication and other indications of operations performed on the file other than the indication. Further, file operation analyzing component 126 can analyze the indications of operations performed on the file stored in the data structure. Additionally, storage allocating component move the file from the first storage device to a second storage device, based on the analyzing the indications.

As described in some examples below, an example system that can benefit in some circumstances from the use of one or more embodiments, is a system that can facilitate moving a file from one storage device to another storage device based on analysis of monitored system calls for the file. In some implementations, system 100 can be a data protection system. In different implementations, data protection systems can copy host data from primary storage in a computing device to secondary storage.

As discussed further with FIG. 3 below, example systems which can employ one or more of the approaches described with embodiments herein include, but are not limited to, EMC ISILON®, an example network attached storage (NAS) platform provided by DELL EMC, Inc. Example storage array devices which can employ one or more of the approaches described with embodiments herein include, but are not limited to, PowerMax enterprise data storage array system provided by DELL EMC, Inc.

Figure 2:
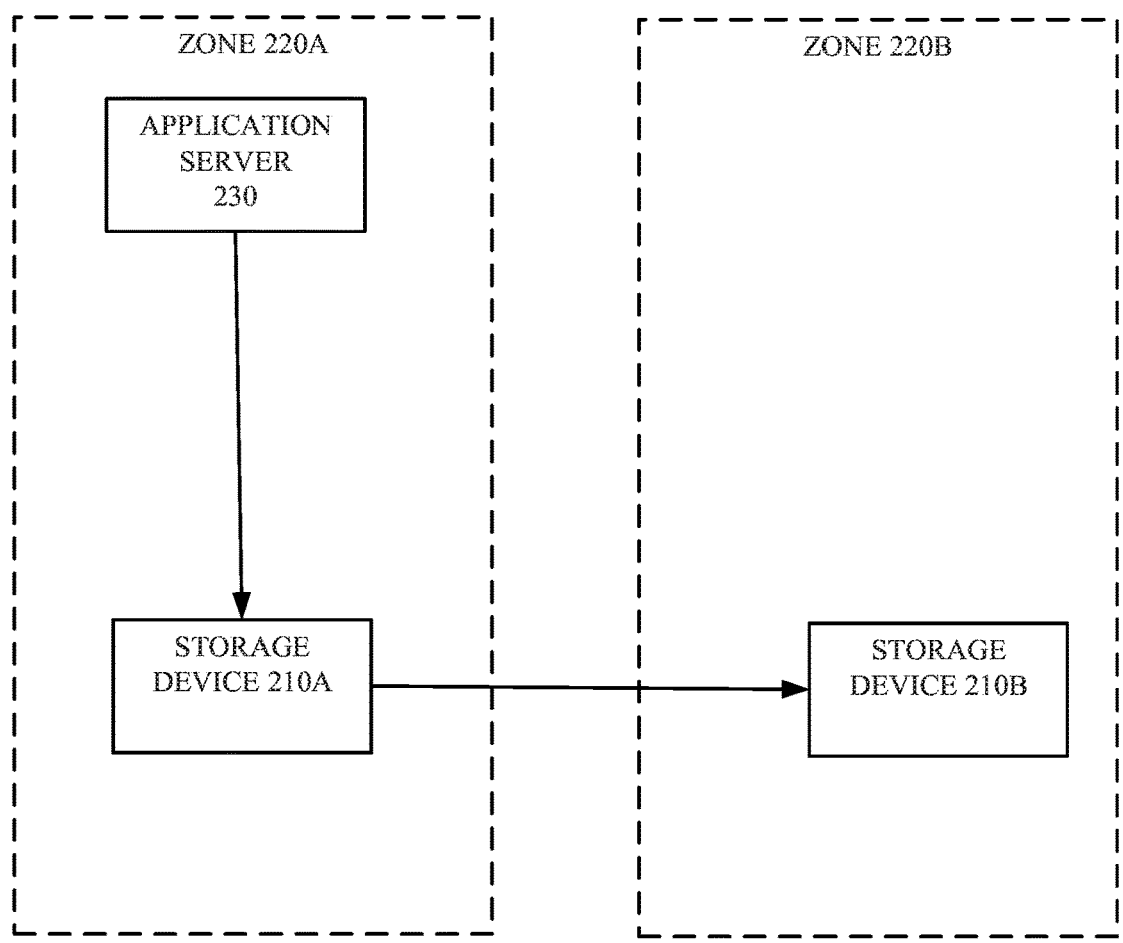
FIG. 2 illustrates a block diagram of a system that can facilitate moving a file from one storage device to another storage device based on analysis of monitored system calls for the file, in accordance with one or more embodiments.
Figure 3:
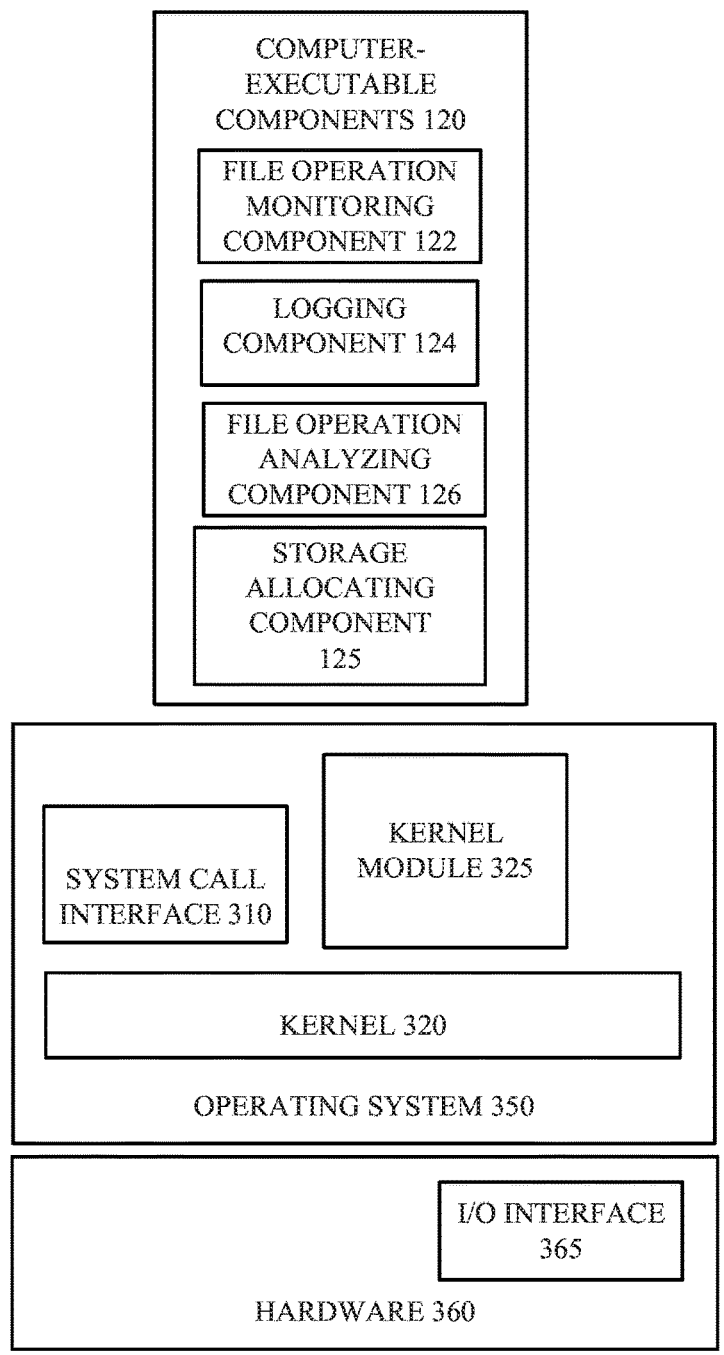
FIG. 3 illustrates a block diagram of a system that can facilitate moving a file from one storage device to another storage device based on analysis of monitored system calls for the file, in accordance with one or more embodiments.
Figure 4:
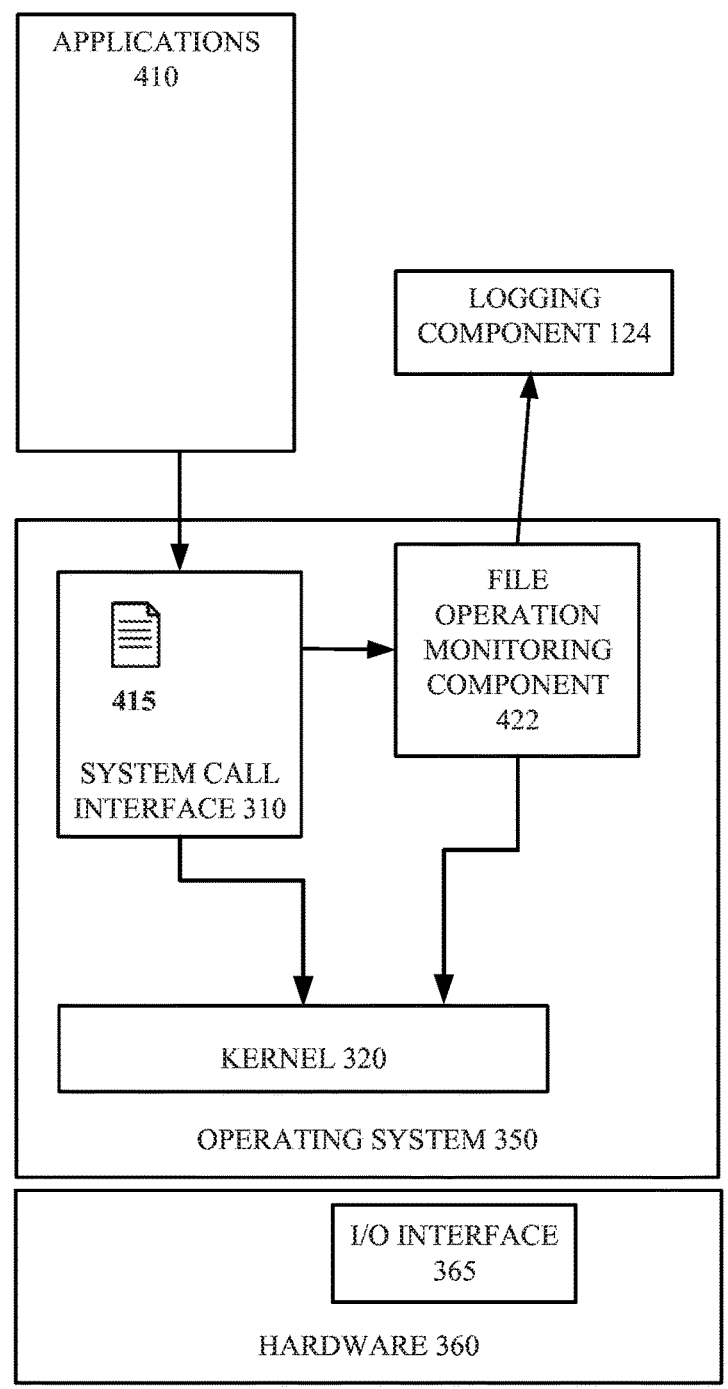
FIG. 4 a block diagram of a system that can facilitate moving a file from one storage device to another storage device based on analysis of monitored system calls for the file, in accordance with one or more embodiments.

To add additional details to the embodiments introduced above, as discussed below, FIG. 2 depicts storage devices with different storage characteristics, FIGS. 3-5 illustrate the relationship in embodiments between application, operating system, and hardware layers, and FIG. 6 discusses the assessment, by one or more embodiments, of the storage characteristics of storage devices.

FIG. 2 illustrates a block diagram of a system 200 that can facilitate moving a file from one storage device to another storage device based on analysis of monitored system calls for the file, in accordance with one or more embodiments. Repetitive description of like elements and/or processes employed in respective embodiments is omitted for sake of brevity.

System 200 includes illustrative zones 220A-B. Zone 220A includes application server 230 and storage device 210A. Zone 220B includes storage device 210B. In this example, application server 230, storage device 210A, and storage device 210B are communicatively coupled. In this example, zones 220A-B are included to illustrate differences between storage devices 210A-B. In one or more embodiments, the movement of a file between the storage device 210A and the conditions of zone 220A to storage device 210B and the conditions of zone 220B.

In one or more embodiments, conditions in zones 220A-B can include characteristics of the storage of data by storage devices 210A-B, also termed storage characteristics of storage devices 210A-B. In some examples discussed herein, storage characteristics for a device can include characteristics of storage performance for the device, with sample characteristics including, but not limited to, throughput, bandwidth, and response time of a storage device. One aspect of one or more embodiments is a storing of data where appropriate storage performance for the data is available. Further, because providing storage performance increases overall system overhead. One or more embodiments can provide approaches where not only is a requested or required level of storage performance is provided, but also storage performance provided does not exceed a threshold, e.g., to reduce overhead.

For example, in one or more embodiments, a threshold can be set where resources allocated to storage performance do not exceed a highest estimated future storage performance requested or required for the storage device, e.g., storage device 210A. In one or more embodiments, by maintaining this range of storage performance for particular data, sufficient performance can be maintained, while excessive allocation can be reduced, in some circumstances. FIG. 6 below includes example approaches that can be used by one or more embodiments to assess storage performance, e.g., metrics that can be used to evaluate the storage characteristics of storage devices 210A-B.

In an exemplary embodiment, zone 220A includes one or more storage devices 210A being devices of a NAS system. Typically, NAS systems include dedicated file storage that enables client devices to retrieve data from a centralized disk system located at a business site. Because NAS systems are typically designed to be primary storage systems (e.g., hold current data that in high demand by users), these systems can have many features designed to increase storage performance of the systems as compared to other systems without such features. For example, being attached to a local area network (LAN) can facilitate increased throughput, bandwidth, and overall response time of data storage operations. Further, NAS systems can employ electronic (solid-state) non-volatile computer memory storage media (e.g. flash memory), which can also improve the storage performance of zone 220A. Example NAS systems that can use flash memory include the EMC ISILON® NAS Platform, provided by DELL EMC, as noted above.

Continuing this example, to illustrate several combinations of features of one or more embodiments described herein, zone 220B includes one or more devices 210B being devices of a cloud-based storage system. Typically, such systems follow a cloud computing model where data can be stored on remote servers accessed from the internet. In many implementations, such systems are maintained, operated and managed by a cloud storage service provider.

Comparing zones 220A and 220B using approaches discussed below, in this example, zone 220A has higher storage performance than zone 220B, e.g., reading or writing data will be slower with zone 220B. With respect to the cost of storage however, zone 220A, in this example, can be more expensive, e.g., in initial cost, maintenance, and operating cost of storage. Thus, in some circumstances, given the characteristics of zones 220A-B, one way to increasing efficiency can be to identify files that are stored (or will be stored) in zone 220A, but do not require the storage performance of zone 220A. One approach to this identification process for files presently stored in zone 220A can be, in one or more embodiments, to monitor the usage of the files over time, e.g., by employing file operation monitoring component 122 to identify one or more system calls associated with file.

As will be understood, the implementation(s) described herein are non-limiting examples, and variations to the technology can be implemented. For instance, even though examples described herein where NAS stored files are identified and moved to a cloud storage system, the technologies described herein can be used by any data storage system having different zones of storage performance, e.g., a storage device components of a NAS system that uses flash storage and a storage device component of the NAS system that uses spinning magnetic disk drives. As such, any of the embodiments, aspects, concepts, structures, functionalities, implementations and/or examples described herein are non-limiting, and the technology may be used in various ways that provide benefits and advantages in data storage technology in general.

FIG. 3 illustrates a block diagram of a system 300 that can facilitate moving a file from one storage device to another storage device based on analysis of monitored system calls for the file, in accordance with one or more embodiments. Repetitive description of like elements and/or processes employed in respective embodiments is omitted for sake of brevity.

System 300 can include computer executable components 120, as discussed with FIG. 1 above, operating system 350, and hardware 360. Computer executable components 120 can include file operation monitoring component 122, logging component 124, file operation analyzing component 126, storage allocating component 125, any other components discussed herein that can be used with FIG. 1, and other examples. In one or more embodiments, operating system 350 can include kernel 320, system call interface 310, and kernel module 325. Hardware 360 can include hardware components described in FIG. 1 above and FIG. 10 below, e.g., processor 160, storage component 170, memory 165, and communications interface 195. In addition, in embodiments depicted in FIG. 3, hardware 360 can further include I/O interface 365.

As discussed above, one or more embodiments can monitor file operations (e.g., by file operation monitoring component 122), analyze the operations (e.g., by file operation analyzing component 126), and move files to different storage devices 210A-B based on the analysis (e.g., by storage allocating component 125). One or more embodiments can monitor a variety of file operations, including but not limited to, read operations, write operations, and delete operations, e.g., reading from, writing to, and deleting, a file stored by operating system 350 on storage device 210A.

Different operating systems 350 can be used by one or more embodiments, and the different operating systems 350 can use different approaches to implement the monitoring of file system operations for files stored in storage devices 210A-B. One approach that can be used is to implement system call interface 310 for kernel 320. In some implementations, system call interface 310 can receive and relay system calls to kernel 320, e.g., system calls from applications to perform operations on files. As discussed below, in one or more embodiments system call interface 310 can be used to monitor incoming system calls, e.g. for particular files that can be manipulated by embodiments.

In addition to system call interface 310, one or more embodiments can also utilize kernel module 325 to perform different actions of embodiments. Generally speaking, kernel module 325 can be custom code that is added to the operation of kernel 320. In some implementations, kernel module 325 can be termed a loadable kernel module (LKM), a kernel loadable module (KLD), a kernel extension (KExt), and kernel-mode drivers. As described below, FIG. 4 describes one or more embodiments where different computer-executable components 120 can be implemented as kernel modules 325.

One or more embodiments can analyze different aspects of unstructured data files to select from different storage device options. In an example approach, as discussed above, a selected one or more system calls for a file are detected, e.g., at the operating system 350 level by kernel module 325 receiving system call information from system call interface 310.

In one or more embodiments, system calls to be monitored can be selected based on characteristics of the data stored in the files, and how these characteristics affect requirements for accessing or manipulating the file. For example, for one type of data in an organization, a combination of user ID ownership, initial storage date, and size of the file have a correlation with a requirement for a reduced response time for the data file, e.g., the user ID can correspond with the importance of the data, and a combination of the initial storage time of the data file and the size of the data file can correspond to the relevance of the data file. Continuing this example, for this particular type of data file, importance and relevance can be combined to select from zones 220A and 220B describe above, e.g., zone 220A can be selected for relatively important and relevant data.

As noted above, for the monitored files of this example, attributes that include the user ID ownership, the initial storage time, and the size of the files are determined to be useful for determining storage characteristics for the files, e.g., whether it is more advantageous to store particular files in zone 220A or 220B.

FIG. 4 is a block diagram of a system 400 that can facilitate moving a file from one storage device to another storage device based on analysis of monitored system calls for the file, in accordance with one or more embodiments. Repetitive description of like elements and/or processes employed in respective embodiments is omitted for sake of brevity. In one or more embodiments, system 400 can include applications 410, logging component 124, operating system 350, and hardware 360. Operating system 350 can include system call interface 310, kernel 320, and file operation monitoring component 422. System call interface 310 includes system calls table 415. In some operating system 350 implementations, As noted above, FIG. 4 depicts file operation monitoring component 422 instead of kernel module 325. In this example, a component similar to file operation monitoring component 122 can be implemented using a kernel module 325 framework, e.g., as supplemental code that is included within kernel 320 to provide additional functions for embodiments.

One approach to using a combination of system call interface 310 and kernel module 325 (e.g., file operation monitoring component 422), can modify system calls table 415. In an example implementation, this implementation of a kernel module can be loaded and establish an alternate operation of one or more system calls of interest to the implementation of one or more embodiments, this process also being termed establishing a hook for a function, and hooking kernel functions. One type of alternate operation for a system call can alter the system calls table 415, e.g., to add additional functions into the execution of the function by kernel 320. In one or more embodiments, these additional functions can pass monitoring information to the kernel module, e.g., file operation monitoring component 422. In one or more embodiments, once these alternative, monitoring operations are performed, the execution is shifted back to the kernel functions associated with the original performance of the system call.

As discussed further below, FIG. 5 illustrates a portion of a system calls table 417, e.g., a list of different types of system calls that can be monitored by one or more embodiments. Along with the discussion of the system calls of FIG. 5, additional examples are discussed below, with reference to FIGS. 4 and 5. When considering the system calls monitored by one or more embodiments, it should be noted that, as discussed in the example above, certain system calls can be identified that have a correlation with file demand characteristics. In some embodiments, increasing the number of system calls that are collected and analyzed can improve the accuracy of the analysis, e.g., by file analyzing component 126.

FIG. 5 lists out example system calls 500 for a kernel that can be monitored to facilitate moving a file from one storage device to another storage device, in accordance with one or more embodiments. Repetitive description of like elements and/or processes employed in respective embodiments is omitted for sake of brevity.

Example system calls 700 list read functions 510, including SYS_read, SYS_ready, SYS_preadv, and SYS_pread. Example system calls 700 further list write Functions 520, including SYS_write, SYS_writev, SYS_pwritev, and SYS_pwrite. Example system calls 700 further list calls to open a file 530, including SYS_open. Example system calls 700 further list calls to delete a file 540, including SYS_unlink. Example system calls 700 further list calls to change permissions 550, including SYS_chmod. Example system calls 700 further list calls to change owner 560 of a file, including SYS_chown. Example system calls 700 further list calls to read a user ID of the file's owner, a group ID of the file, a status of the file 570, including SYS_stat, SYS_fstat, and SYS_lstat.

Figure 6:
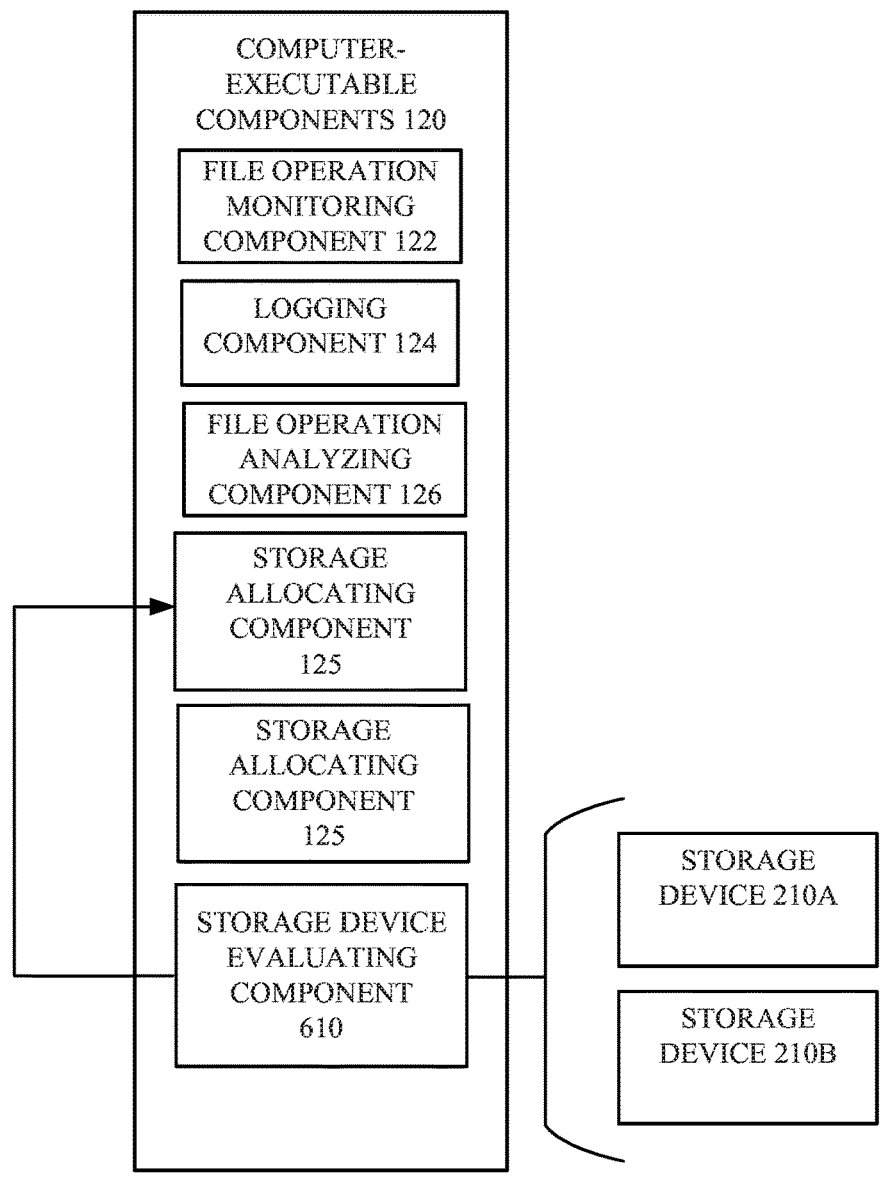
FIG. 6 illustrates a block diagram of a system that can facilitate moving a file from one storage device to another storage device based on analysis of monitored system calls for the file, in accordance with one or more embodiments.

FIG. 6 illustrates a block diagram of a system 600 that can facilitate moving a file from one storage device to another storage device based on analysis of monitored system calls for the file, in accordance with one or more embodiments. Repetitive description of like elements and/or processes employed in respective embodiments is omitted for sake of brevity.

System 600 includes computer executable components 120, and storage devices 210A-B. As depicted in FIG. 6, computer-executable components 120 can include file operation monitoring component 122, logging component 124, file operation analyzing component 126, storage device evaluating component 610, and storage allocating component 125.

As noted with FIG. 2 above, one or more embodiments can select from storage devices that have different storage characteristics. To facilitate this, in one or more embodiments, storage device evaluating component 610 can access one or more storage metrics of accessible storage devices. One having skill in the relevant art(s), given the description herein, would appreciate that these metrics can include, but are not limited to storage capacity, input output operations per second (IOPS), representing the number of input and output operations processed per unit time, MB/s or Megabytes Per Second (MBPS) representing I/O data throughput per unit time, and response time representing the time to complete processing a user's request.

In one or more embodiments, factors that can influence storage performance metrics include, but are not limited to, hardware conditions such as server performance, storage connection interfaces, and whether caches are used, software conditions such as file systems, operating systems and applications, and workload characteristics such as whether to use random access or sequential access, read/write ratio and I/O block size.

Figure 7:
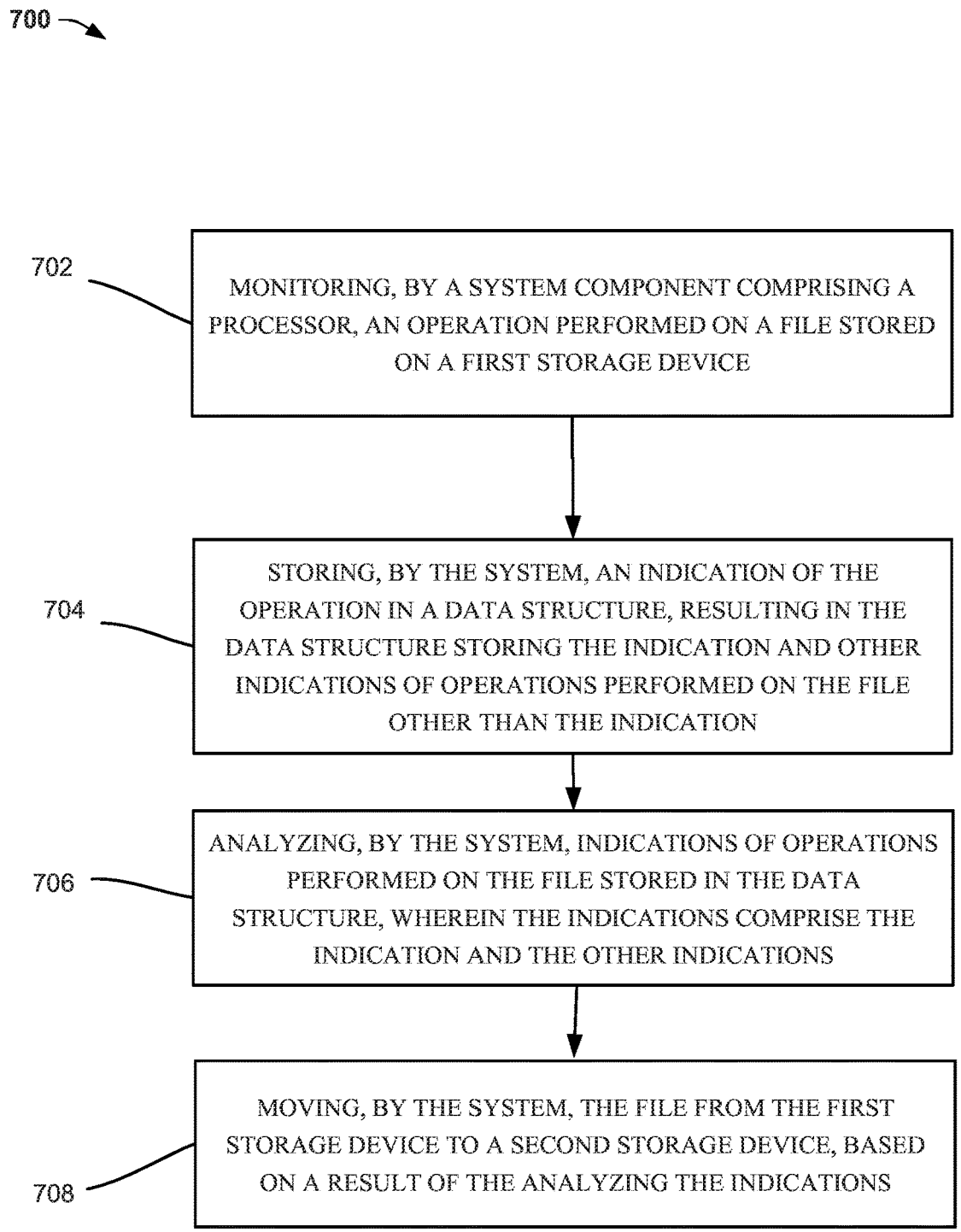
FIG. 7 illustrates an example flow diagram for a method that can facilitate the generating of shared authentication keys using network connection characteristics, in accordance with one or more embodiments.

FIG. 7 illustrates an example flow diagram for a method 700 that can facilitate moving a file from one storage device to another storage device based on analysis of monitored system calls for the file, in accordance with one or more embodiments. For purposes of brevity, description of like elements and/or processes employed in other embodiments is omitted.

At element 702, method 700 can comprise monitoring, by a system comprising a processor, an operation performed on a file stored on a first storage device. In an embodiment, method 700 can comprise monitoring, by a system comprising a processor, an operation (e.g., by file operation monitoring component 122) performed on a file stored on a first storage device 210A.

At element 704, method 700 can comprise storing an indication of the operation in a data structure, resulting in the data structure storing the indication and other indications of operations performed on the file. In an embodiment, method 700 can comprise storing an indication of the operation in a data structure, resulting in the data structure storing (e.g., by logging component 124) the indication and other indications of operations performed on the file.

At element 706, method 700 can comprise analyzing the indications of operations performed on the file and other indications other than the indication stored in the data structure. In an embodiment, method 700 can comprise analyzing (e.g., by file operation analyzing component 126) the indications of operations performed on the file stored in the data structure.

At element 708, method 700 can comprise moving the file from the first storage device to a second storage device, based on the analyzing the indications. In an embodiment, method 700 can comprise moving the file from the first storage device 220A to a second storage device 210B, based on the analyzing the indications.

Figure 8:
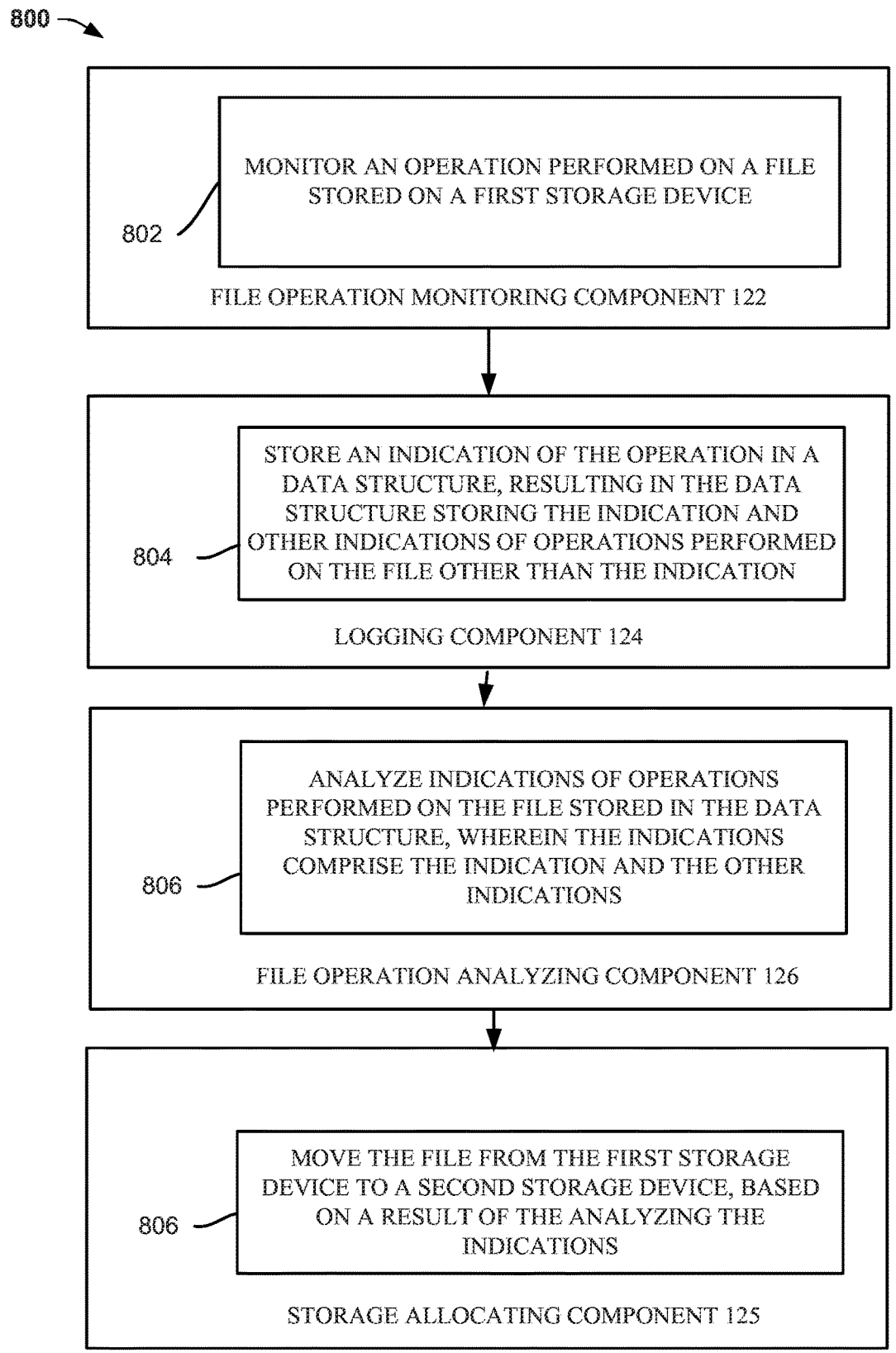
FIG. 8 is a flow diagram representing example operations of an example system comprising a file operation monitoring component, a logging component, a file operation analyzing component, and a storage allocating component that can facilitate moving a file from one storage device to another storage device based on analysis of monitored system calls for the file, in accordance with one or more embodiments.

FIG. 8 is a flow diagram representing example operations of an example system 800 comprising file operation monitoring component 122, logging component 124, file operation analyzing component 126, and storage allocating component 125 that can facilitate moving a file from one storage device to another storage device based on analysis of monitored system calls for the file, in accordance with one or more embodiments. For purposes of brevity, description of like elements and/or processes employed in other embodiments is omitted.

File operation monitoring component 122 can be configured 802 to monitor an operation performed on a file stored on a first storage device. In one or more embodiments, file operation monitoring component 122 can be configured 802 to monitor an operation performed on a file stored on a first storage device 220A.

Logging component 124 can be configured 804 to store an indication of the operation in a data structure, resulting in the data structure storing the indication and other indications of operations performed on the file. In one or more embodiments, logging component 124 can be configured 804 to store an indication of the operation in a data structure, resulting in the data structure (e.g., a database) storing the indication and other indications of operations performed on the file.

File operation analyzing component 126 can be configured 806 to analyze the indications of operations performed on the file and the other indications stored in the data structure. In one or more embodiments, file operation analyzing component 126 can be configured 806 to analyze the indications of operations performed on the file stored in the data structure.

Storage allocating component 125 can be configured 808 to move the file from the first storage device to a second storage device, based on the analyzing the indications. In one or more embodiments, storage allocating component 125 can be configured 808 to move the file from the first storage device to a second storage device, based on the analyzing the indications.

Figure 9:
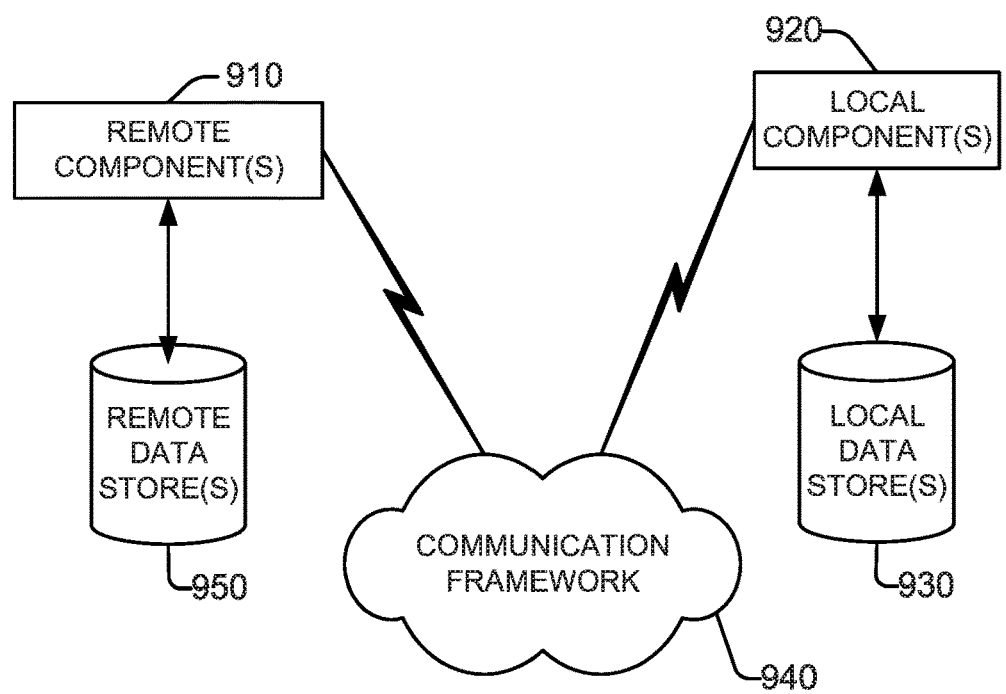
FIG. 9 depicts an example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
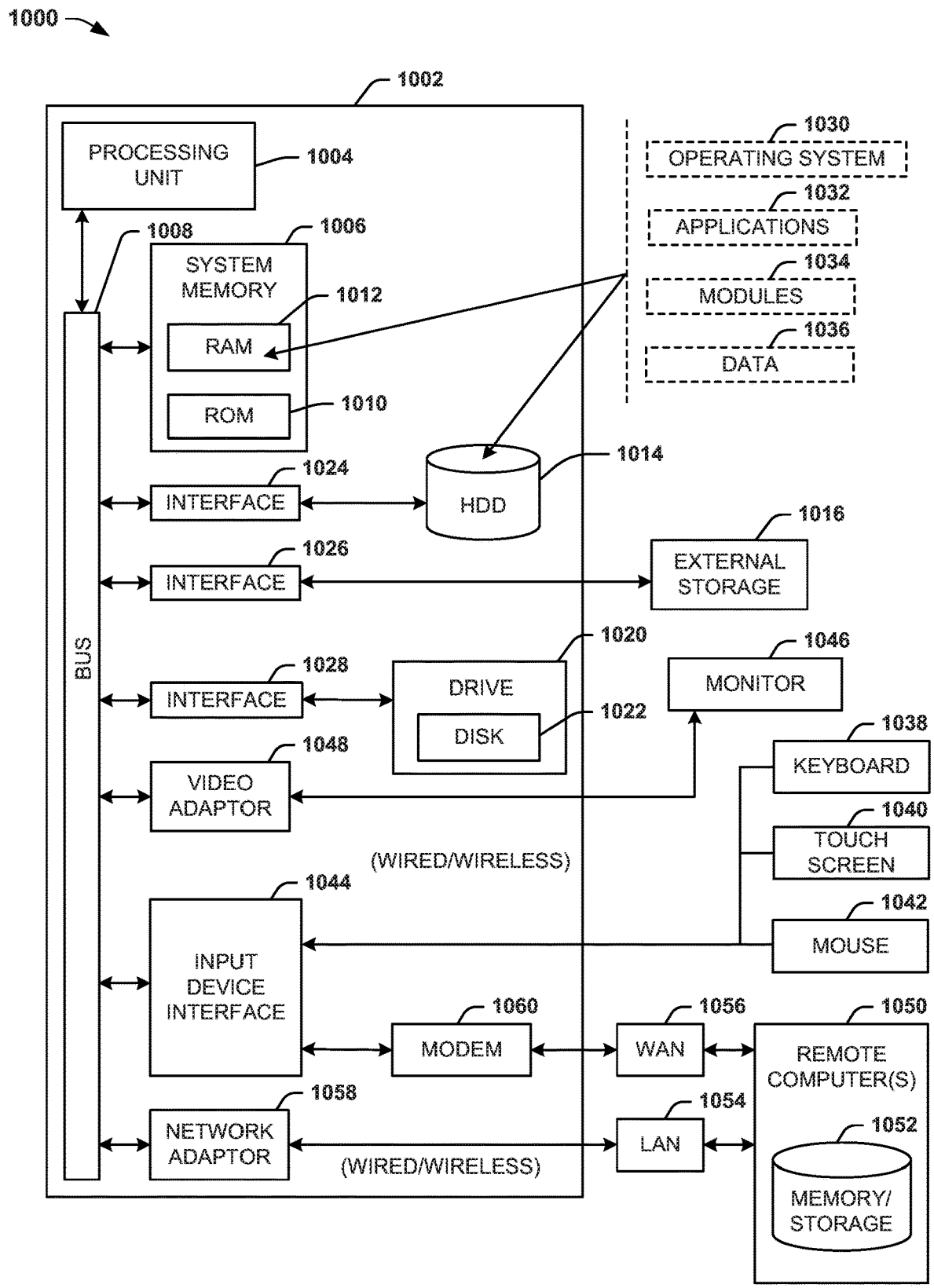
FIG. 10 illustrates an example block diagram of a computing system operable to execute the disclosed systems and methods in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While embodiments are susceptible to various modifications and alternative constructions, certain illustrated implementations thereof are shown in the drawings and have been described above in detail. It should be understood, however, that there is no intention to limit embodiments to the specific forms disclosed, but on the contrary, the intention is to cover all modifications, alternative constructions, and equivalents falling within the spirit and scope of embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, embodiments are not to be limited to any single implementation, but rather is to be construed in breadth, spirit, and scope in accordance with the appended claims.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
monitoring, by a system comprising a processor, a file system operation performed on an unstructured data file stored on a first storage device;
storing an indication of the file system operation in a data structure, resulting in the data structure storing the indication and other indications of operations performed on the unstructured data file other than the indication;
based on content of the unstructured data manipulated by the file system operation, analyzing indications of operations performed on the unstructured data file stored in the data structure, wherein the indications comprise the indication and the other indications; and
moving the unstructured data file from the first storage device to a second storage device, based on a result of the analyzing the indications, wherein the result comprises an importance value that corresponds to an importance of the unstructured data file, wherein monitoring the file system operation comprises facilitating, by a kernel of an operating system of the system, performance of a system call operation on the unstructured data file.

2. The method of claim 1, wherein monitoring the file system operation further comprises:
receiving, by the kernel, the system call operation; and
storing, by a kernel module loaded into the kernel, information corresponding to details of the system call operation.

3. The method of claim 1, further comprising rating the first storage device and the second storage device based on respective storage characteristics of the first storage device and the second storage device, resulting in ratings of storage devices, wherein moving the unstructured data file from the first storage device to the second storage device is further based on the ratings of the storage devices.

4. The method of claim 3, wherein the storage characteristics of the storage devices comprise a storage cost for the storage devices.

5. The method of claim 3, wherein the storage characteristics of the storage devices comprise a storage performance for the storage devices.

6. The method of claim 1, wherein the file system operation performed on the unstructured data file comprises a file read operation.

7. The method of claim 1, wherein the file system operation performed on the unstructured data file comprises a file update operation.

8. The method of claim 1, wherein analyzing the indications of the operations performed on the unstructured data file comprises predicting a likelihood that the unstructured data file will be accessed within a defined period of time.

9. A first device, comprising:
a processor; and
a memory that stores executable instructions that, when executed by the processor, facilitate performance of operations, comprising:
receiving, from a second device, a first indication of an operation that was performed on content of an unstructured data file stored on a second storage device, wherein the unstructured data file comprises unstructured data;
storing the first indication of the operation in a data structure, resulting in the data structure storing the first indication with second indications of operations performed on the unstructured data file;
analyzing indications of operations, comprising the first indication and the second indications, performed on the unstructured data file stored in the data structure resulting in an analysis result comprising an importance value that corresponds to an importance of the unstructured data file; and
based on the importance value, communicating, to the second device, a command to move the unstructured data file to a third device, wherein analyzing the indications comprises facilitating by a kernel of an operating system, performance of a system call operation on the unstructured data file.

10. The first device of claim 9, wherein the first indication of the operation was communicated by the second device based on the system call operation to be performed on the unstructured data file being received by the kernel.

11. The first device of claim 9, wherein the operations further comprise rating the second device and the third device based on respective storage characteristics of the second device and the third device, resulting in storage ratings of devices, and wherein communicating the command to move the unstructured data file to the third device is based on the storage ratings of the devices.

12. The first device of claim 11, wherein the storage characteristics of the devices comprise a storage cost for the respective storage devices measured according to a defined cost criterion.

13. The first device of claim 11, wherein the storage characteristics of the devices comprise a storage performance for the respective storage devices measured according to a defined performance criterion.

14. The first device of claim 9, wherein the operation that was performed on the unstructured data file comprises a file read operation.

15. The first device of claim 9, wherein the operation that was performed on the unstructured data file comprises a file update operation.

16. The first device of claim 9, wherein analyzing the indications of the operations performed on the unstructured data file comprises predicting a likelihood that the unstructured data file will be accessed within a specified period of time.

17. A non-transitory machine-readable medium comprising executable instructions that, when executed by a processor of a computing device, facilitate performance of operations, the operations comprising:

detecting a system call operation performed on unstructured data stored on a first storage device communicatively coupled to the computing device, wherein performance of the system call operation was facilitated by a kernel of an operating system;

storing an indication of the system call operation at a database server device, resulting in the indication being stored with other indications of system call operations performed on the unstructured data stored at the database server device;

retrieving indications of operations performed on content of the unstructured data from the database server device, resulting in retrieved indications comprising the indication and the other indications; and based on a result of analyzing the retrieved indications, moving the unstructured data from the first storage device to a second storage device, wherein the result comprises an importance value for the unstructured data determined from the operations performed on the content.

18. The non-transitory machine-readable medium of claim 17, wherein detecting the system call operation further comprises receiving, from the kernel, the system call operation to be performed on the unstructured data.

19. The non-transitory machine-readable medium of claim 17, wherein the operations further comprise an operation rating the first storage device and the second storage device based on respective storage characteristics of the first storage device and the second storage device, resulting in respective ratings of storage devices, and wherein moving the unstructured data file from the first storage device to the second storage device is further based on the respective ratings of the storage devices.

20. The non-transitory machine-readable medium of claim 19, wherein the storage characteristics of the storage devices comprise a storage cost for the storage devices.

* * * * *